United States Patent [19]

Ohzeki et al.

[11] Patent Number: 4,569,846
[45] Date of Patent: Feb. 11, 1986

[54] PROCESS FOR PREPARING FOODS BY LACTIC FERMENTATION

[75] Inventors: Masanao Ohzeki; Takashi Murata, both of Tokyo; Hiroshi Kanda, Kanagawa, all of Japan

[73] Assignee: Nisshin Oil Mills, Ltd., Tokyo, Japan

[21] Appl. No.: 400,185

[22] Filed: Jul. 20, 1982

[30] Foreign Application Priority Data

Jul. 23, 1981 [JP] Japan ................................ 56-114477

[51] Int. Cl.$^4$ ............................................. A23C 9/12
[52] U.S. Cl. ........................................ 426/40; 426/41; 426/43; 426/46; 426/582; 426/602
[58] Field of Search ................... 426/34, 40, 42, 43, 426/44, 46, 52, 409, 580, 598, 582, 583, 601, 602, 603, 613, 564, 570; 435/139

[56] References Cited

U.S. PATENT DOCUMENTS

| | | | |
|---|---|---|---|
| 3,443,960 | 5/1969 | Noznick et al. | 425/564 |
| 3,743,516 | 7/1973 | Lundstedt et al. | 426/40 |
| 4,107,343 | 8/1978 | Petricca | 426/570 |
| 4,273,790 | 6/1981 | Bosco et al. | 426/603 |
| 4,279,941 | 7/1981 | Bosco et al. | 426/603 |

Primary Examiner—Raymond Jones
Assistant Examiner—Marianne M. Cintins
Attorney, Agent, or Firm—Kane, Dalsimer, Kane, Sullivan and Kurucz

[57] ABSTRACT

A new food by lactic fermentation which has a good shape-maintaining property when squeezed from a squeezing tube at normal and lower temperatures is prepared by emulsifying an aqueous solution of non-fat milk solids and/or soybean proteins and fats to form an O/W type emulsion and subjecting said emulsion to lactic fermentation, the protein content of said O/W type emulsion is between 2 and 10% by weight, the fat content is between 20 and 40% by weight and the solid fat index of said fat is characterized as follows:

6~30 at 5° C., 3~20 at 15° C., 1~10 at 25° C. and difference between 5° and 15°0 C. being not more than 10, and difference between 15° and 25° C. being not more than 10.

8 Claims, No Drawings

PROCESS FOR PREPARING FOODS BY LACTIC FERMENTATION

BACKGROUND OF THE INVENTION

This invention relates to a process for the preparation of foods by lactic fermentation which comprises emulsifying an aqueous solution of non-fat milk solids and/or soybean proteins and fats and subjecting the resulting emulsion to lactic fermentation.

There are, hitherto, provided foods by the lactic fermentation starting from fats and non-fat milk solids and/or soybean proteins, for example a vegetable cheese.

However, these products vary in properties between lower temperatures and normal temperature. It is, also, difficult to squeeze them from a squeezing tube which is used for whip creams. If it is possible to easily squeeze such products from the squeezing tube either after preservation at normal temperature or immediately after taking out from a refrigerator and the squeezed product having a good shape-maintaining property, these products are very useful and convenient for spreads and toppings in desserts. A process for the preparation of foods by the lactic fermentation having such properties is not yet known.

SUMMARY OF THE INVENTION

An object of this invention is to provide foods by lactic fermentation, of which properties hardly vary depending on temperatures and which have a good shape-maintaining property when squeezed from a squeezing tube.

These properties are to be retained even after the preservation at lower temperature, the preservation at normal temperature and the preservation repeated at lower temperature-normal temperature.

We have diligently studied and found that the foregoing object can be attained by selecting a specified protein content, fat content and solid fat index of the fat used.

In accordance with this invention, there is provided a process for the preparation of foods by lactic fermentation which comprises emulsifying an aqueous solution of non-fat milk solids and/or soybean proteins and fats to form an oil-in-water type emulsion and subjecting the emulsion obtained to lactic fermentation, the protein content of said oil-in-water type emulsion being between 2% and 10% by weight, the fat content being between 20% and 40% by weight and the solid fat index of said fat being characterized as follows:

6~30 at 5° C.; 3~20 at 15° C.; 1~10 at 25° C.; difference between 5° and 15° C. being not more than 10 and difference between 15° and 25° C. being not more than 10.

DETAILED DESCRIPTION OF THE INVENTION

The non-fat milk solids which may be used in this invention include, for example, skim milk, skim milk powders, casein, sodium caseinate and cheese whey.

The soybean protein which may be used includes, for example, fat-containing soybean flours, defatted soybean flours, isolated soybean proteins and soybean protein concentrates, which are obtained by conventional methods.

Using the above ingredient alone or in mixture of two or more, an aqueous solution is prepared and emulsified with fats having the solid fat index (hereinafter referred to as SFI) as defined above.

As for the fat a vegetable or edible fat and oil may be used.

Herein, the protein content is between 2% and 10%, preferably 4% and 8% by weight and the fat content between 20% and 40%, preferably 20% and 30% by weight.

The SFI of the fat is characterized as given hereunder:

6~30, preferably 6~15 at 15° C.; 3~20, preferably 3~11 at 15° C.; 1~10, preferably 1~6 at 25° C.; difference between 5° and 15° C. not more than 10, preferably 1~6; difference between 15° and 25° C. not more than 10, preferably 1~6.

The emulsification may be carried out in the conventional method, temperature and time for emulsification. After the emulsification, if desired, the emulsified product is homogenized.

Next, sterilization is effected under conventional conditions, for example, at 60° C. for 30 minutes or at 150° C. for 3 seconds.

After the sterilization the emulsion is cooled and by adding a lactic bacteria starter, is subjected to lactic fermentation in conventional methods. The starter may be lactic acid bacteria capable of starting the lactic fermentation and not particularly limited to species.

Examples of the lactic bacteria include *Streptococcus lactis, St. cremoris, St. thermophilus* and *Lactobacillus bulgaricus*, which may be used alone or in mixture of two or more. As for the fermentation temperature the optimum temperature for the lactic bacteria used is employed.

The protein and fat contents affect the hardness of the curd obtained after fermentation and further, properties of the final product. If the protein content is less than 2% by weight, the curd is soft and accordingly, the final product is soft. Thus, when the final product is squeezed from a squeezing tube, the squeezed product is inferior in the shape-maintaining property and its appearance becomes worse due to running over.

On the other hand, with the protein content of more than 10% by weight, the curd becomes hard and accordingly, the hardness of the final product is increased. Thus, the final product is too hard to be squeezed from the squeezing tube and also, the squeezed product is inferior in the appearance.

As for the fat content, in case of not more than 20% by weight the final product is too soft, while with more than 40% by weight the hardness of the final product is increased. Thus, in either case the squeezing property becomes worse and the shape-maintaining property and appearance of the squeezed product are inferior.

Even if the fat having the SFI as defined above is used, the final product of desired properties cannot be obtained unless the protein and fat contents are within the range as defined above.

Foods by the lactic fermentation are prepared varying the protein and fat contents as set forth in Table 1 in accordance with the process of Example 1 described hereinafter and preserved at 5° C. and 20° C. When these are squeezed from the squeezing tube, the appearance of the squeezed product and the squeezing property (easiness of squeezing) are rated. The test results are set forth in Table 1.

TABLE 1

| Content of Fat % | Temp. of Preservation °C. | Content of Protein % | | |
|---|---|---|---|---|
| | | <2 | 2~10 | >10 | lactic fermentation and using a 22.5 g cone. The values are indicated as an average of three values excluded the maximum and minimum values from five measurements.

TABLE 2

| | SFI | | | | | Differences of SFI | |
|---|---|---|---|---|---|---|---|
| | 5° C. | 10° C. | 15° C. | 20° C. | 25° C. | 5°~15° C. | 15°~25° C. |
| Fat A: Hydrogenated rapeseed oil | 22.3 | 19.0 | 15.3 | 11.3 | 7.8 | 7.0 | 7.5 |
| Fat B: Hydrogenated palm oil | 57.1 | 52.8 | 45.0 | 35.3 | 26.0 | 12.1 | 19.0 |
| Fat C: Partially hydrogenated rapeseed oil | 3.5 | 3.0 | 2.1 | 0 | — | 1.4 | — |

TABLE 3

| | Temp. of Preservation °C. | Two days after preparation | | | 14 days after preparation | | | 30 days after preparation | | |
|---|---|---|---|---|---|---|---|---|---|---|
| | | Hardness 1/10 mm | Squeezing Property | Appearance of Squeezed Products | Hardness 1/10 mm | Squeezing Property | Appearance of Squeezed Products | Hardness 1/10 mm | Squeezing Property | Appearance of Squeezed Products |
| Fat A | 5 | 185 | A | A | 187 | A | A | 183 | A | A |
| | 20 | 201 | A | A | 198 | A | A | 197 | A | A |
| Fat B | 5 | 93 | D | C | 83 | D | C | 70 | D | C |
| | 20 | 135 | C | B | 115 | C | B | 95 | D | C |
| Fat C | 5 | 250 | B | D | 253 | B | D | 251 | B | D |
| | 20 | 273 | B | D | 275 | B | D | 280 | B | D |

| Squeezing Property | <20 | 5 | B | B | C |
|---|---|---|---|---|---|
| | | 20 | B | B | B |
| | 20-40 | 5 | B | A | C |
| | | 20 | B | A | C |
| | >40 | 5 | A | C | C |
| | | 20 | B | C | C |
| Appearance of Squeezed Products | <20 | 5 | C | B | C |
| | | 20 | C | C | C |
| | 20-40 | 5 | B | A | C |
| | | 20 | C | A | B |
| | >40 | 5 | B | C | C |
| | | 20 | C | B | C |

Notes:
Rating of the squeezing property
A ... Fair
B ... Rather soft
C ... Rather hard
D ... Hard
Rating of the appearance of squeezed products
A ... Fair
B ... Rather inferior
C ... Inferior
D ... Running over As is apparent from Table 1, even when fats having the desired SFI are used, the protein content outside the range of 2~10% by weight or the fat content outside the range of 20~40% by weight bring about unfavourable results.

Next, the use of fats having the desired SFI is essential for lessening the effect of temperature on the properties of the product and retaining the feature with the lapse of time.

Using Fats A, B and C having different SFI values as set forth in Table 2, foods by the lactic fermentation are prepared in accordance with the process of Example 1 and preserved at 5° C. and 20° C.

The hardness of the products is measured by means of a cone penetrometer and also, the squeezed property and the appearance of the squeezed product are observed with the lapse of time as set forth in Table 3.

The hardness is measured at indicated preservation temperatures by filling a 300 g cup with the food by lactic fermentation and using a 22.5 g cone. The values are indicated as an average of three values excluded the maximum and minimum values from five measurements.

It is clear from Table 3 that foods using Fat A having the SFI defined in this invention are superior in the squeezing property and appearance of the squeezed product and particularly, even after the prolonged preservation. Further, the properties hardly vary on the temperature change between 5° C. and 20° C. and accordingly, the products are improved in the temperature-stability.

On the other hand, when using Fat B having SFI at indicated temperatures larger than that defined in this invention, the extruding condition is hard and the appearance of the extrudate is inferior. Particularly, after the prolonged preservation the extruding condition and appearance become worse.

Further, the properties vary between 5° C. and 20° C. and thus, the product is inferior in the temperature-stability.

Also, when using Fat C having SFI at indicated temperatures smaller than that defined in this invention, the product is so soft that it is running over upon squeezing either at 5° C. or 20° C. and thus, is inferior in the shape-maintaining property.

As mentioned above, by specifying the protein and fat contents of the oil-in-water type emulsion and the SFI of the fat according to this invention, there are provided the foods by lactic fermentation which hardly vary in the properties between lower temperature and normal temperature, i.e. improved in the temperature-stability and have a good squeezing property and shape-maintaining property.

Accordingly, the products of this invention, either after preservation at normal temperature or immediately after taking out from a refrigerator, can be easily squeezed with good appearance of the squeezed product. Therefore, these are useful for spreads and toppings in desserts.

This invention will be illustrated by the following non-limitative Examples.

EXAMPLE 1

50 g of skim milk powders and 40 g of isolated soybean proteins (content of crude protein 85%, nitrogen solubility index 85) were dissolved in 610 g of warm water at 50° C. and emulsified together with 300 g of a hydrogenated rapeseed oil having SFI values as follows: 14.7 at 5° C., 12.3 at 10° C., 8.7 at 15° C., 6.5 at 20° C. and 4.5 at 25° C.

The emulsified product was homogenized and sterilized at 70° C. for 15 minutes, followed by cooling to 30° C.

St. lactis starter was added and fermentation was effected at 30° C. over night, thus 950 g of food by lactic fermentation being obtained. The products were charged into a squeezing tube and preserved at 5° C. and 20° C. The squeezing property and the appearance of the squeezed product were observed with the lapse of time. The results are set forth in Table 4.

EXAMPLE 2

35 g of skim milk powders, 35 g of casein and 30 g of a concentrated fruit juice were dissolved in 500 g of warm water at 45° C., heated to 70° C. and emulsified together with 400 g of a hydrogenated soybean oil having SFI values as follows: 26.7 at 5° C., 23.2 at 10° C., 19.1 at 15° C., 14.1 at 20° C. and 9.9 at 25° C. The emulsion obtained was sterilized at 90° C. for 5 minutes and cooled to 25° C. A starter mixture of St. lactis and St. cremoris was added and fermentation was effected at 25° C. over night, thus 950 g of food by lactic fermentation being obtained.

The products were charged into a squeezing tube and preserved at 5° C. and 20° C. The squeezing property and the appearance of the squeezed product were observed with the lapse of time. The results are set forth in Table 4.

EXAMPLE 3

100 g of soybean protein concentrates (crude protein content 69%, nitrogen solubility index 10) were dissolved in 700 g of warm water at 50° C. and emulsified together with 200 g of an oil mixture of 20 parts of a fractionized palm oil and 80 parts of rapeseed oil, having SFI values as follows: 6.9 at 5° C., 6.4 at 10° C., 3.6 at 15° C., at 2.6 at 20° C. and 1.1 at 25° C.

The emulsion obtained was sterilized at 150° C. for three seconds and cooled to 40° C.

Lactobacillus bulgaricus starter was added and fermentation was conducted at 40° C. for five hours, thus 900 g of food by lactic fermentation being obtained.

The products were charged into a squeezing tube and preserved at 5° C. and 20° C. The squeezing property and the appearance of the squeezed product were observed with the lapse of time. The results are set forth in Table 4.

The emulsions of Examples 1 to 3 have the protein and oil contents within the scope of this invention.

TABLE 4

| | Temp. of Preservation °C. | Two days after preparation | | | 14 days after preparation | | | 30 days after preparation | | |
|---|---|---|---|---|---|---|---|---|---|---|
| | | Hardness* 1/10 mm | Squeezing Property | Appearance of Squeezed Products | Hardness 1/10 mm | Squeezing Property | Appearance of Squeezed Products | Hardness 1/10 mm | Squeezing Property | Appearance of Squeezed Products |
| Example 1 | 5 | 193 | A | A | 190 | A | A | 189 | A | A |
| | 20 | 213 | A | A | 214 | A | A | 210 | A | A |
| Example 2 | 5 | 178 | A | A | 175 | A | A | 174 | A | A |
| | 20 | 190 | A | A | 192 | A | A | 188 | A | A |
| Example 3 | 5 | 210 | A | A | 210 | A | A | 210 | A | A |
| | 20 | 230 | A | A | 232 | A | A | 230 | A | A |

*The measurement method is the same as in Table 3.

Table 4 shows that the products of Examples 1 to 3 are improved in the squeezing property and the appearance of the squeezed product and particularly, even after the prolonged preservation.

Also, the properties hardly vary on the temperature change between 5° and 20° C. and accordingly, the products have good temperature-stability.

What is claimed is:

1. A process for the preparation of foods by lactic fermentation which comprises emulsifying fats and an aqueous solution of non-fat milk solids and/or soybean proteins to form an oil-in-water type emulsion and subjecting the emulsion obtained to lactic fermentation by adding a lactic acid bacteria starter to the emulsion, the protein content of said oil-in-water type emulsion being between 2% and 10% by weight, the fat content being between 20% and 40% by weight and the solid fat index of said fat being characterized as follows:

6–30 at 5° C.; 3–20 at 15° C.; 1–10 at 25° C.; difference between 5° C. and 15° C. being not more than 10 and difference between 15° C. and 25° C. being not more than 10.

2. The process of claim 1 wherein said non-fat milk solid is at least one selected from the group consisting of skim milk, skim milk powders, casein, sodium caseinate and cheese whey.

3. The process of claim 1 wherein said soybean protein is at least one selected from the group consisting of fat-containing soybean flours, defatted soybean flours, isolated soybean proteins and soybean protein concentrates.

4. The process of claim 1 wherein said fat is a hydrogenated rapeseed oil.

5. The process of claim 1 wherein said fat is a hydrogenated soybean oil.

6. The process of claim 1 wherein said fat is an oil mixture of a fractionized palm oil and rapeseed oil.

7. The process of claim 1 wherein said oil-in-water type emulsion is subjected to homogenizer treatment prior to the lactic fermentation.

8. The process of claim 1 wherein said lactic acid bacteria starter is one selected from the group consisting of Streptococcus lactis, Streptococcus cremoris, Streptococcus thermophilus and Lactobacillus bulgaricus.

* * * * *

UNITED STATES PATENT AND TRADEMARK OFFICE
CERTIFICATE OF CORRECTION

PATENT NO. : 4,569,846
DATED : February 11, 1986
INVENTOR(S) : Masanao Ohzeki et al It is certified that error appears in the above-identified patent and that said Letters Patent is hereby corrected as shown below:

Col. 1, line 12 of the Abstract; - "15°O C." should read
-- 15°C. -- .

Col. 2, line 29; - "Examples of the lactic bacteria" should read
-- Examples of the lactic acid bacteria -- .

Col. 3, Table 1, lines 30-49; beginning with the word "Squeezing" and ending with "D ... Running over" this section of Table 1 is in the wrong place, it should be moved up to continue as line 4, of Table 1 in Column 3.

Col. 6, Claim 1, line 11 of Claim 1; - "6-30", "3-20" and "1-10" should read -- 6~30, 3~20 and 1~10 -- .

Signed and Sealed this

First Day of July 1986

[SEAL]

Attest:

DONALD J. QUIGG

Attesting Officer    Commissioner of Patents and Trademarks